United States Patent [19]

Maucher et al.

[11] 4,367,704

[45] Jan. 11, 1983

[54] INTERNAL COMBUSTION ENGINE WITH SEPARABLE CRANKSHAFTS

[75] Inventors: Paul Maucher, Sasbach; Oswald Friedmann, Lichtenau, both of Fed. Rep. of Germany

[73] Assignee: Luk Lamellen und Kupplungsbau GmbH, Bühl, Fed. Rep. of Germany

[21] Appl. No.: 233,960

[22] Filed: Feb. 12, 1981

[30] Foreign Application Priority Data

Feb. 13, 1980 [DE] Fed. Rep. of Germany ....... 3005368

[51] Int. Cl.³ .............................................. F02B 75/18
[52] U.S. Cl. .................................. 123/198 F; 123/52 A
[58] Field of Search .......................... 123/198 F, 52 A

[56] References Cited

U.S. PATENT DOCUMENTS

4,069,803  1/1978  Cataldo ........................... 123/198 F

FOREIGN PATENT DOCUMENTS

2828298  1/1980  Fed. Rep. of Germany ... 123/198 F

*Primary Examiner*—Tony M. Argenbright
*Attorney, Agent, or Firm*—Kontler, Grimes & Battersby

[57] ABSTRACT

An internal combustion engine wherein a first group of cylinders rotates a first crankshaft and a second group of cylinders can rotate a second crankshaft which can be separably coupled to the first crankshaft by an accelerating friction clutch. The clutch permits slippage of a first clutch member which is driven by one of the crankshafts relative to a second clutch member which drives the other crankshaft while the other crankshaft undergoes gradual acceleration to the speed of the one crankshaft. Once the speed of the other crankshaft matches or closely approximates the speed of the one crankshaft, and the other crankshaft assumes a predetermined angular position relative to the one crankshaft, the first clutch member ceases to slip relative to the second clutch member. The accelerating clutch can be interposed between two camshafts one of which is driven by the one crankshaft and the other of which drives the other crankshaft during acceleration of the other crankshaft. The engine is then equipped with a positive-engagement second clutch which is installed between the two crankshafts and is engaged as soon as the other crankshaft rotates at the speed of the one crankshaft and assumes the desired angular position with respect to the one crankshaft.

30 Claims, 2 Drawing Figures

INTERNAL COMBUSTION ENGINE WITH SEPARABLE CRANKSHAFTS

BACKGROUND OF THE INVENTION

The present invention relates to internal combustion engines in general, and more particularly to improvements in internal combustion engines of the type wherein several groups of cylinders can rotate discrete crankshafts. Still more particularly, the invention relates to improvements in internal combustion engines of the type having a first engine section or unit which comprises a first crankshaft adapted to be rotated by a first group of cylinders, at least one further section or unit whose crankshaft or crankshafts can be rotated by one or more additional groups of cylinders, and means for connecting the crankshafts to each other when the speed of the previously idle crankshaft or crankshafts is adequately increased to match or approximate the speed of the driven crankshaft.

It is already known to deactivate a group of cylinders in a multi-cylinder internal combustion engine when the engine is to operate at partial load. This entails substantial savings in fuel and reduces the quantity of deleterious combustion products which are discharged into the surrounding atmosphere. Reference may be had to German Offenlegungsschrift No. 28 28 298 which discloses a method of operating an internal combustion engine having several cylinders which are disposed in a common cylinder block. The engine has a composite crankshaft which includes several discrete crankshafts each associated with a given group of cylinders. When the engine is to be operated at partial load, e.g., immediately after starting, the cylinders of a first group of cylinders drive the corresponding discrete crankshaft while the remaining cylinders and the corresponding discrete crankshaft or crankshafts remain idle. If the engine is to be thereupon operated at full load, it is necessary to accelerate the remaining crankshaft or crankshafts to the speed of the crankshaft which is driven by the first group of cylinders, and to couple the crankshafts to each other only when the crankshafts assume predetermined angular positions.

OBJECTS AND SUMMARY OF THE INVENTION

An object of the invention is to provide an internal combustion engine of the type having several crankshafts with novel and improved means for connecting such crankshafts to or for disconnecting such crankshafts from each other.

Another object of the invention is to provide novel and improved means for ensuring that the crankshafts can be coupled to each other at proper times as concerns their angular velocities and/or mutual angular positions.

A further object of the invention is to provide novel and improved clutch means for use in an engine of the above outlined character.

An additional object of the invention is to provide novel and improved means for actuating the clutch which can establish or terminate a torque transmitting connection between discrete crankshafts of an internal combustion engine.

A further object of the invention is to provide the engine with means which allows for full engagement of the clutch only and alone when the angular velocities of the crankshafts to be coupled are in proper relationship to each other as well as when the angular positions of the crankshafts to be connected are in optimum relation to one another.

Still another object of the invention is to provide a relatively simple, rugged, compact and readily accessible torque transmitting connection between discrete crankshafts of an internal combustion engine.

A further object of the invention is to provide an apparatus which is capable of automatically effecting full torque transmitting engagement between discrete crankshafats of an internal combustion engine only when the speed and the angular position of the crankshaft which is to be coupled to an already driven crankshaft match predetermined values.

Another object of the invention is to provide a compact and fuel-saving internal combustion engine which embodies the above outlined apparatus.

The invention resides in the provision of an internal combustion engine which comprises a first engine section or unit having a first rotary crankshaft which can be rotated by a first group of clyinders, a second engine section or unit having a second rotary crankshaft which can be rotated by a second group of cylinders and, in accordance with an advantageous feature of the invention, is parallel to the first crankshaft, and an accelerating clutch (e.g., a dry friction clutch) which is actuatable to transmit torque from one of the crankshafts to the other of the crankshafts. The clutch includes a first clutch member which receives torque from the one crankshaft (the one crankshaft can be driven by the respective group of clyinders when the engine is operated at partial load), a second clutch member which serves to transmit torque to the other crankshaft and to receive torque from the first clutch member, and mechanical, hydraulic, electronic and/or otherwise constructed actuating means for gradually increasing the rate of torque transmission from the first to the second clutch member until the rotational speed of the second clutch member at least approximates (or actually matches) the rotational speed of the first clutch member. The parallel crankshafts are preferably installed in a common casing or housing.

The actuating means is designed to increase the rate of torque transmission from the first to the second clutch member to a maximum value (at which the first clutch member does not slip relative to the second clutch member) in a predetermined angular position of the other crankshaft with reference to the one crankshaft. The clutch members can be coaxial with the one or the other crankshaft. If the first clutch member is rigid with the one crankshaft, the engine further comprises means for rotating the other crankshaft in response to rotation of the second clutch member. Such rotating means may comprise a first torque transmitting element (preferably a first gear) which is rigid with the second clutch member and a second torque transmitting element (preferably a second gear) which is driven by the first torque transmitting element and is rigid with the other crankshaft. The ratio of the gears is preferably one-to-one.

If the second clutch member is rigid with the other crankshaft and is coaxial with the first clutch members the engine further comprises means for rotating the first clutch member in response to rotation of the one crankshaft. Such rotating means may include a first torque transmitting element (preferably a first gear) which is rigid with the one crankshaft and a second torque transmitting element (preferably a second gear) which is driven by the first torque transmitting element and is rigid with the first clutch member. The ratio of such gears is again one-to-one.

The aforementioned actuating means is preferably designed to increase the rate of torque transmission from the first to the second clutch member to a maximum value (at which the first clutch member ceases to turn relative to the second clutch member) in a predetermined angular position of the other crankshaft relative to the one crankshaft. Torsional shock absorber means (e.g., of the type known from the art of clutches which are used between the output element of the engine and the input element of the transmission in an automotive vehicle) can be interposed between the two clutch members to take up the initial shock when the first clutch member begins to transmit torque to the second clutch member.

The novel features which are considered as characteristic of the invention are set forth in particular in the appended claims. The improved engine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
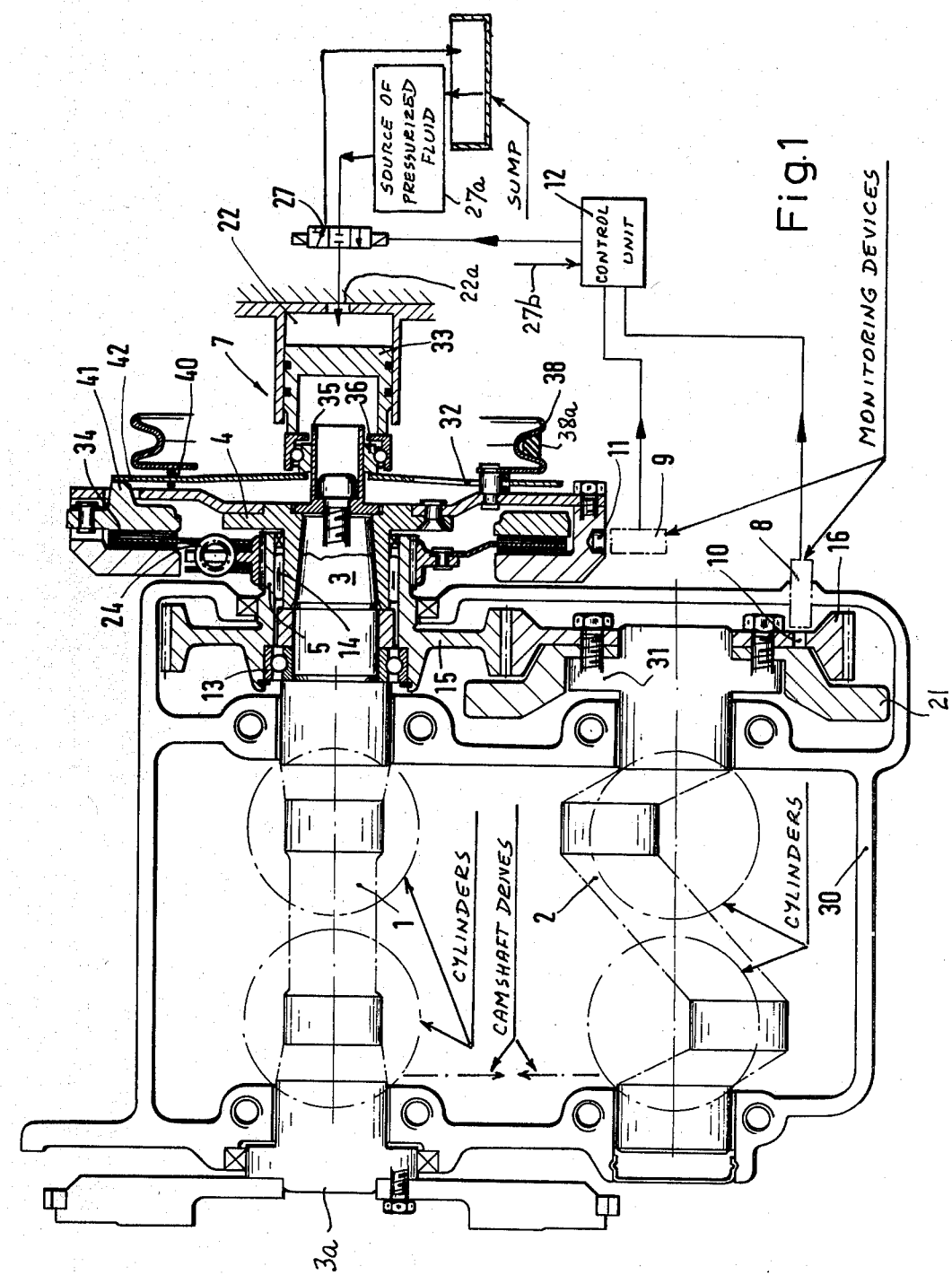
FIG. 1 is a partly schematic sectional view of an internal combustion engine which embodies one form of the invention and wherein the accelerating clutch has driving and driven clutch members which are coaxial with the one crankshaft.

Referring first to FIG. 1, there is shown a portion of an internal combustion engine with two discrete units or sections. The first unit or section comprises a first crankshaft 1 which rotates when the engine is operated at partial load, for example, immediately after starting, as well as when the engine is operated at full load. Thus, the crankshaft 1 rotates whenever the engine is running and has an end portion 3 which is remote from the end portion (3a) that transmits torque to one or more driven components of the vehicle in which the engine is installed. The end portion 3 of the crankshaft 1 extends from the housing or casing 30 of the engine and carries a first clutch member 4 which is rigidly secured thereto so that the clutch member 4 shares all angular movements of the crankshaft 1. The clutch member 4 constitutes a first component and a second clutch member 5 constitutes a second component of a clutch which serves to accelerate (when necessary) a second crankshaft 2 of the engine and to thereupon ensure that the second crankshaft rotates at the speed of the first crankshaft. The second clutch member 5 is preferably concentric to the first clutch member 4 and the first crankshaft 1. As shown in FIG. 1, the second clutch member 5 is rotatable on antifriction bearings 13 and 14 which surround a substantially cylindrical portion of the clutch member 4. The clutch member 5 comprises a torque transmitting spur gear 15 which meshes with a torque transmitting spur gear 16 mounted on the right-hand end portion of the second crankshaft 2. The gear 15 may constitute a separable or integral part of the second clutch member 5. Analogously, the gear 16, which is in permanent mesh with the gear 15, can be separably or integrally connected with the second crankshaft 2. In the embodiment of FIG. 1, the second gear 16 is bolted at 31 to a collar 21 of the crankshaft 2. The ratio of the gears 15 and 16 is one-to-one. This ensures that, when the first crankshaft 1 drives the gear 15 through the fully engaged accelerating clutch including the clutch members 4 and 5, the speed of the second crankshaft 2 is identical with that of the crankshaft 1. The axes of the crankshafts 1 and 2 are parallel to each other.

The device (hereinafter called actuating device) which serves to engage or disengage the accelerating clutch including the clutch members 4 and 5 is denoted by the reference character 7. In normal operation, the clutch including the members 4 and 5 is engaged. When the clutch is to be disengaged, the actuating device 7 must furnish a force which overcomes the force of a spring 32 serving to normally engage the clutch member 5 with the clutch member 4 so that the clutch member 5 is rotated at the exact speed of the crankshaft 1. During acceleration of the clutch member 5, the clutch member 4 slips relative to the clutch member 5 to a greater or lesser extent, depending on the momentary speed ratio of the members 4 and 5. The means for establishing a frictional torque transmitting engagement between the clutch members 4 and 5 includes one or more friction discs 34. The magnitude of friction between the clutch members 4 and 5 depends upon the force which a piston 33 of the actuating device 7 applies against the spring 32. In order to avoid or eliminate shocks during transmission of torque between the clutch members 4 and 5, the first clutch member 4 preferably carries a conventional torsional shock absorber means or damping device 24 having a disc-shaped member serving to carry the friction disc or discs 34.

The actuating device 7 further comprises at least one valve 27 which regulates the flow of pressurized hydraulic fluid from a source 27a into a cylinder chamber 22 for the piston 33. The valve 27 can regulate the rate of admission of pressurized fluid into as well as the rate of evacuation of such fluid from the chamber 22 to thereby determine the axial position of the piston 33 which is reciprocable in the chamber 22. When the piston 33 is shifted in a direction to the left, as viewed in FIG. 1, it causes the central portion of the spring 32 to move in the same direction whereby the spring pivots about a seat 40 and its outer or marginal portion 42 reduces the pressure upon the projections (only one shown) 41 of a pressure plate which bears against the friction disc or discs 34 and, as a result of such bias, regulates the extent of torque-transmitting engagement between the clutch members 4 and 5. The arrangement is such that, when the piston 33 is shifted in response to admission of pressurized hydraulic fluid into the cylinder chamber 22, the marginal portion 42 of the spring 32 moves in a direction to the right, as viewed in FIG. 1, whereby the extent of frictional engagement between the clutch members 4 and 5 is reduced. The spring 32 is preferably a dished spring which is pivotable at 40. The piston 33 transmits motion to the central portion of the spring 32 by way of an antifriction bearing 36 one race of which rotates with the spring 32 and the other race of which is connected to the left-hand end portion of the piston 33. The bearing 36 surrounds a cylindrical sleeve 35 which constitutes an extension of the end portion 3 of the crankshaft 1. The sleeve 35 extends through a central opening of the spring 32.

The means for shifting the valving element of the valve 27 comprises a control unit 12 which has an output for transmission of signals to the solenoid or solenoids of the valve 27 and several inputs including a first input connected to the output of a first monitoring device 8 and a second input connected to the output of a second monitoring device 9. The monitoring device 8 serves to track the angular position of the crankshaft 2 and cooperates with an orbitable magnet 10 or an analogous portion of the gear 16 which is secured to and rotates the crankshaft 2. The monitoring device 8 is mounted in the casing 30 and may constitute a proximity detector which transmits a signal whenever the magnet 10 advances past its left-hand end portion, as viewed in FIG. 1. The other monitoring device 9 serves to track the angular position of the crankshaft 1 and cooperates with a magnet 11 or another signal generation initiating portion on a rotary part which shares the angular movements of the crankshaft 1. In the illustrated embodiment, the monitoring device 9 is adjacent to the circumference of the clutch member 4 and generates signals whenever the portion 11 advances therealong. Each of the monitoring devices 8, 9 can comprise a conventional inductive transducer. Signals which are transmitted by the monitoring devices 8 and 9 denote the angular positions of the respective crankshafts, and the frequencies at which such signals are generated denote the rotational speeds of the respective crankshafts. It goes without saying that the monitoring device 8 can be installed adjacent to the collar 21 or adjacent to a portion of the crankshaft 2. Analogously, the monitoring device 9 can be placed adjacent to a portion of the crankshaft 1, i.e., the device 9 need not be installed at the periphery of the clutch member 4 which is driven by the end portion 3 of the crankshaft 1.

The control unit 12 comprises means for evaluating the signals which are transmitted by the outputs of the monitoring devices 8 and 9. The evaluating means (e.g., a suitable circuit), the details of which forms no part of the present invention, ascertains the rotational speed of each of the two crankshafts 1 and 2 as well as the angular positions of the crankshafts at any stage of operation of the engine which embodies the structure shown in FIG. 1. As stated above, the rotational speed of each crankshaft can be readily ascertained by monitoring the frequency at which the corresponding monitoring devices 9 and 8 transmit signals to the respective inputs of the control unit 12. The angular position of the crankshaft 2 relative to the crankshaft 1 can be ascertained by monitoring the length of intervals between the generation of a signal by the monitoring device 9 and the generation of a signal by the monitoring device 8.

When the rotational speed of the crankshaft 2 has been increased to such an extent that it equals or at least closely approximates the speed of the crankshaft 1, the output of the control unit 12 transmits a signal to the valve 27. Such signal is further supposed to indicate that the second crankshaft 2 has assumed a predetermined angular position with preference to the first crankshaft 1. The valve 27 then connects the chamber 22 with a sump for hydraulic fluid so that the spring 32 can push the piston 33 in a direction to the right, as viewed in FIG. 1, and the piston 33 expels the fluid into the sump by way of the valve 27. At such time, the spring 32 pivots with reference to its seat 40 and its marginal portion 42 bears with a greater force against the projections 41 so that the frictional engagement between the clutch members 4 and 5 suffices to ensure that the rotational speed of the clutch member 5, and hence the rotational speed of the crankshaft 2, matches the rotational speed of the crankshaft 1.

The operation of the structure which is shown in FIG. 1 is as follows:

It is assumed that certain cylinders (e.g., two cylinders) of the engine drive the crankshaft 1 and that the clutch including the members 4 and 5 is disengaged. In other words, the crankshaft 2 does not rotate. If the operator of the vehicle which embodies the engine including the crankshafts 1 and 2 desires to operate the engine at maximum load, the crankshaft 2 must be coupled to the crankshaft 1. To this end, the operator causes the control unit 12 (note the input 27b) to adjust the valve 27 so that the latter allows for gradual outflow of hydraulic fluid from the chamber 22. This causes the piston 33 to advance in a direction to the right, as viewed in FIG. 1, with attendant pivoting of the spring 32 about its seat 40 in a direction to move its marginal portion 42 against the projections 41 and to thereby gradually increase the frictional engagement between the clutch members 4 and 5 through the medium of the friction disc or discs 34. In other words, the magnitude of torque which the clutch member 4 transmits to the clutch member 5 increases gradually at a rate which is a function of the speed of movement of the piston 33 in the chamber 22 toward the inlet-outlet opening 22a. The clutch member 5 gradually accelerates the second crankshaft 2.

The monitoring devices 8 and 9 transmit signals which respectively denote the angular velocities of the crankshafts 2 and 1 as well as the angular positions of the respective crankshafts. When the crankshaft 2 assumes a predetermined angular position with reference to the crankshaft 1, and when the speed of the crankshaft 2 reaches or approximates the speed of the crankshaft 1, the output of the control unit 12 transmits a signal which causes the valve 27 to establish a practically unobstructed connection between the chamber 22 and the sump so that the piston 33 is free to abruptly move in a direction to the right. This enables the spring 32 to fully engage the clutch members 4 and 5. From there on, the clutch member 5 rotates at the exact speed of the clutch member 4 and positively drives the crankshaft 2 through the medium of torque-transmitting gears 15 and 16.

The actuating device 7 can be modified in a number of ways without departing from the spirit of the invention. For example, this device can be replaced with a device which embodies or utilizes a liquid-filled bellows. Furthermore, it is possible to replace the hydraulic actuating device 7 with a mechanical device having means which responds to the output signal of the control unit 12 to change the condition of the spring 32 and to thereby regulate the transmission of torque from the clutch member 4 to the clutch member 5, i.e., from the crankshaft 1 to the crankshaft 2.

FIG. 1 further shows that the crankshaft 1 drives a pulley 38 which is installed outside of the casing 30 and receives torque from the end portion 3, for example, through the medium of the clutch member 4. The pulley 38 drives a V-belt 38a which can transmit motion to one or more auxiliary apparatus in the vehicle embodying the structure of FIG. 1. Such auxiliary apparatus may include the generator of the lighting system, a water pump or a cooling fan, not shown.

An important advantage of the improved engine is that the crankshafts 1 and 2 are parallel to each other. This ensures that the crankshafts are not subjected to torsional stresses which arise in an engine with serially arranged (coaxial) crankshafts (as disclosed, for example, in the aforementioned German Offenlegungsschrfit No. 28 28 298) when the engine is operated at maximum load. Consequently, the crankshafts 1 and 2 which are used in the engine of the present invention can be manufactured at a fraction of the cost of crankshafts which must be connected in series. As mentioned above, operation with less than the total number of cylinders allows for considerable savings in fuel and is desirable for ecological reasons (pronounced reduction of emission of deleterious combustion products into the surrounding atmosphere). The selection of the number of cylinders which are in use will be up to the operator of the vehicle which embodies the improved engine. As mentioned above, a single crankshaft will be driven by the respective group of cylinders immediately after starting and whenever the engine is to operate at partial load, and one or more additional crankshafts can be coupled to the crankshaft which is driven by the one group whenever the load upon the engine is to be increased.

The mounting of all crankshafts (and of the corresponding camshafts) in a common housing is desirable and advantageous because it entails considerable savings in space, a reduction of the weight and reduction of initial cost of the engine.

The mounting of the clutch outside of the casing 30 brings about the advantage that the component parts of the clutch are readily accessible for the purpose of maintenance, repair and/or replacement.

Figure 2:
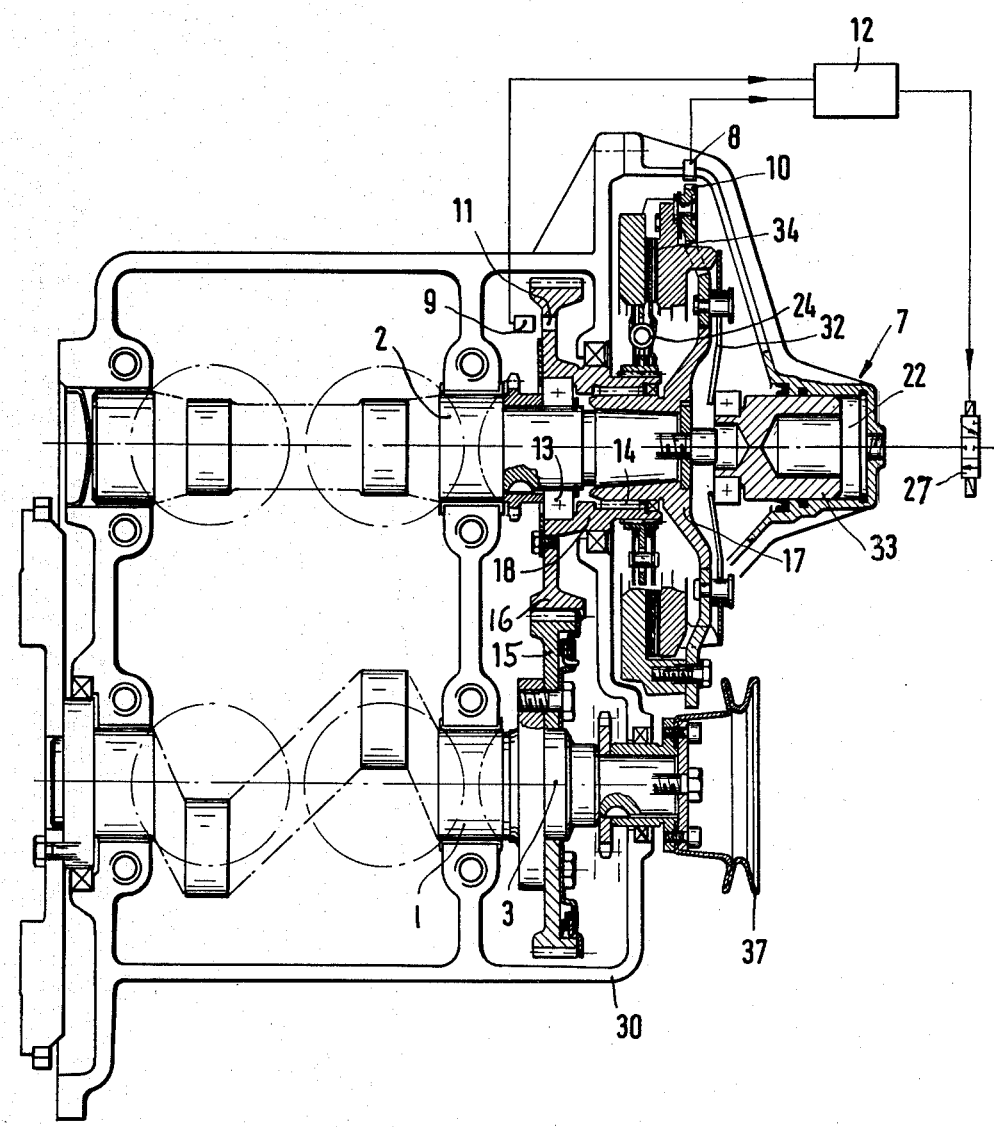
FIG. 2 is a similar partly schematic sectional view of an internal combustion engine wherein the accelerating clutch is coaxial with the other crankshaft.

FIG. 2 illustrates a modified construction wherein the clutch between the crankshafts 1 and 2 comprises cooperating clutch members 17 and 18. The crankshaft 1 is installed at a level below the crankshaft 2 and its end portion 3 drives a torque transmitting gear 15 meshing with a torque transmitting gear 16 which drives the clutch member 18. The latter corresponds to the clutch member 4 of FIG. 1. The clutch member 17 corresponds to the clutch member 5 of FIG. 1 and serves to transmit torque to the second crankshaft 2. The end portion 3 of the lower crankshaft 1 drives a pulley 37 which corresponds to the pulley 38 of FIG. 1.

It will be noted that, contrary to the construction shown in FIG. 1, the structure of FIG. 2 embodies an accelerating clutch 17, 18 which is coaxial with the second crankshaft 2. The clutch including the clutch members 17 and 18 transmits torque to the second crankshaft 2 when the engine which drives the crankshafts 1 and 2 is to be operated at maximum load. The clutch member 18 surrounds a portion of the clutch member 17 which latter is rigidly connected to the respective end portion of the upper crankshaft 2.

All such components of the second apparatus which are identical with or clearly analogous to the corresponding components of the apparatus shown in FIG. 1 are denoted by similar reference characters. For example, the reference character 30 denotes the casing for the crankshafts 1 and 2, the reference character 12 denotes a control unit, the reference character 27 denotes a valve, and the reference characters 8 and 9 denote monitoring devices which respectively monitor the rotational velocities and angular positions of the crankshafts 2 and 1. The belt or belts (not shown) which are driven by the pulley 37 of FIG. 2 can transmit motion to auxiliary apparatus including the aforementioned light generator, water pump and/or cooling fan.

It is further within the purview of the invention to install the accelerating clutch between two camshafts (not shown) and to provide a positive-engagement second clutch between the crankshafts 1 and 2. The positive-engagement clutch is engaged when the accelerating clutch has accelerated the second camshaft to the exact speed of the first camshaft. Each camshaft rotates with the respective crankshaft. Reference may be had to the commonly owned copending application Ser. No. 233,952 filed Feb. 12, 1981 by Lothar Huber et al. for "Apparatus for establishing and terminating connections between crankshafts". The disclosure of this copending application is incorporated herein by reference. When the two camshafts rotate at the same speed, the accelerating clutch permits for or initiates the engagement of the positive-engagement clutch which couples the second crankshaft to the first crankshaft so that the engine can be operated at maximum load. An advantage of the just mentioned modification which is disclosed in the copending application of Huber et al. is that the structure can be embodied with advantage in a four-cycle internal combustion engine wherein the camshaft always completes one revolution for the firing of the cylinders whereas the crankshaft completes two revolutions for each ignition or working stroke of the cylinders. The apparatus then allows for proper coupling of the camshafts to each other so as to ensure the firing of cylinders in proper sequence.

The camshafts are preferably installed in the casing for the crankshafts and the actuating means may be designed to monitor the angular velocities of the camshafts and to effect engagement of the positive engagement clutch between the crankshafts when the continuously driven camshaft completes the acceleration of the other camshaft (associated with the crankshaft 2) to a desired speed and the other camshaft (and hence the respective crankshaft) assumes a predetermined angular position with reference to the continuously driven camshaft. The manner of monitoring the angular positions of the camshafts may be the same as or analogous to that described in connection with FIG. 1, i.e., the camshafts can include or carry portions (e.g., permanent magnets) which travel along endless paths past suitable transducers which generate signals at a frequency corresponding to the RPM of the respective camshafts, and such signals are transmitted to the corresponding inputs of a control unit having an evaluating circuit which ascertains the angular velocities of the two camshafts as well as the angular positions of the camshafts relative to each other and initiates coupling of the crankshafts to each other when the angular velocities of the two camshafts are identical or nearly identical and the accelerated camshaft assumes a predetermined angular position with reference to the continuously driven camshaft to thereby ensure that the cylinders of the engine will be fired in a desired sequence.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In an internal combustion engine, the combination of a first engine section having a first crankshaft; a second engine section having a second crankshaft parallel with said first crankshaft; an accelerating clutch actuatable to transmit torque from one of said crankshafts to the other of said crankshafts, said clutch including a first clutch member receiving torque from said one crankshaft, a second clutch member arranged to transmit torque to said other crankshaft and to receive torque from said first clutch member, and actuating means having means for gradually increasing the rate of torque transmission from said first to said second clutch member until the rotational speed of said second clutch member at least approximates the rotational speed of said first clutch member.

2. The combination of claim 1, further comprising a common casing for said crankshaft.

3. The combination of claim 2, wherein said first and second sections respectively further comprise first and second camshafts rotatably mounted in said casing means for rotating said first camshaft in response to rotation of said one crankshaft and means for transmitting torque between said second camshaft and said other crankshaft.

4. The combination of claim 3, wherein said camshafts are parallel to said crankshafts.

5. The combination of claim 1, wherein said actuating means includes means for increasing the rate of torque transmission from said first to said second clutch members to a maximum value in a predetermined angular position of said other crankshaft with reference to said one crankshaft.

6. The combination of claim 1, wherein said clutch members are coaxial with said one crankshaft.

7. The combination of claim 1, wherein said first clutch member is rigid with said one crankshaft and further comprising means for rotating said other crankshaft in response to rotation of said second clutch member.

8. The combination of claim 7, wherein said means for rotating said other crankshaft in response to rotation of said second clutch member comprises a first torque transmitting element rigid with said second clutch member and a second torque transmitting element driven by the first torque transmitting element and rigid with said other crankshaft.

9. The combination of claim 8, wherein said torque transmitting elements are mating gears and the ratio of said gears is one-to-one.

10. The combination of claim 1, wherein said clutch members are coaxial with said other crankshaft.

11. The combination of claim 10, wherein said second clutch member is rigid with said other crankshaft and further comprising means for rotating said first clutch member in response to rotation of said one crankshaft.

12. The combination of claim 11, wherein said means for rotating said first clutch member in response to rotation of said one crankshaft comprises a first torque transmitting element rigid with said one crankshaft and a second torque transmitting element driven by said first torque transmitting element and rigid with said first clutch member.

13. The combination of claim 12, wherein said torque transmitting elements are mating gears and the ratio of said gears is one-to-one.

14. The combination of claim 1, wherein said actuating means includes means for increasing the rate of torque transmission from said first to said second clutch member to a maximum value in a predetermined angular position of said other crankshaft with reference to said one crankshaft.

15. The combination of claim 1, wherein said means for gradually increasing the rate of torque transmission comprises a fluid-operated device.

16. The combination of claim 1, further comprising torsional shock absorber means interposed between said clutch members.

17. The combination of claim 1, wherein said actuating means comprises a control unit operative to allow for slippage of said clutch members relative to each other during acceleration of said second clutch member to the speed of said first clutch member and to maintain said clutch members in slip-free frictional engagement when the speed of said second clutch member matches the speed of said first clutch member.

18. The combination of claim 1, wherein said actuating means further comprises first monitoring means for generating first signals denoting the angular position and angular velocity of said one crankshaft, second monitoring means for generating second signals denoting the angular position and angular velocity of said other crankshaft, signal generating control means for evaluating said first and second signals, and means effecting slip-free engagement between said clutch members in response to signals from said control means when the velocity of said second clutch member at least approximates the velocity of said first clutch member and said clutch members assume predetermined angular positions with reference to each other.

19. The combination of claim 18, wherein each of said monitoring means comprises a signal initiating portion provided on the respective crankshaft and transducer means adjacent to the path of movement of the corresponding portion and operative to transmit signals in response to movement of the respective portion therealong.

20. The combination of claim 19, wherein said transducer means include inductances.

21. The combination of claim 18, wherein said evaluating means includes means for monitoring the frequencies of generation of said first and second signals, said frequencies being indicative of angular velocities of the respective crankshafts, and means for ascertaining the length of intervals between the generation of successive first and second signals, such intervals being indicative of angular positions of said crankshafts relative to each other.

22. The combination of claim 18, wherein said first and second sections further comprise first and second camshafts and means for rotating said camshafts in synchronism with the respective crankshafts, said monitoring means being positioned to monitor the angular velocities of the respective camshafts.

23. The combination of claim 22, wherein each of said monitoring means comprises a signal initiating portion provided on the respective camshaft and transducer means adjacent to the path of movement of the corresponding portion to transmit signals in response to movement of the respective portion therealong.

24. The combination of claim 23, wherein said transducer means include inductances.

25. The combination of claim 22, wherein said evaluating means includes means for monitoring the frequencies of generation of said first and second signals, such frequencies being indicative of angular velocities of the respective camshafts, and means for ascertaining the length of intervals between the generation of successive first and second signals, such intervals being indicative of the angular positions of said camshafts relative to each other.

26. The combination of claim 1, further comprising a common casing for said crankshaft, said clutch members being disposed externally of said casing.

27. The combination of claim 1, wherein said clutch is a dry friction clutch.

28. The combination of claim 1, wherein said first and second sections respectively further comprise first and second camshafts, and further comprising means for rotating one of said camshafts in response to rotation of said one crankshaft and means for rotating said other crankshaft in response to rotation of the other of said camshafts, said clutch being arranged to transmit torque between said camshafts.

29. The combination of claim 28, further comprising a positive-engagement second clutch interposed between said crankshafts and arranged to drive said other crankshaft in response to rotation of said one crankshaft when the speed of said second clutch member at least approximates the speed of said first clutch member.

30. The combination of claim 29, wherein said actuating means includes means for effecting engagement of said second clutch in a predetermined angular position of said other crankshaft with reference to said one crankshaft.

* * * * *